United States Patent [19]
Broddin et al.

[11] Patent Number: 6,011,631
[45] Date of Patent: Jan. 4, 2000

[54] UNIFORM EXPOSURE OF PHOTOSENSITIVE MEDIUM BY SQUARE INTENSITY PROFILES FOR PRINTING

[75] Inventors: Dirk K. Broddin, Edegem; Frank A. Deschuytere, Beveren; Robert F. Janssens, Geel, all of Belgium; William E. Nelson, Dallas; Vadlamannati Venkateswar, Plano, both of Tex.

[73] Assignees: Texas Instruments Incorporated, Dallas, Tex.; Agfa-Gevaert N.V., Belgium

[21] Appl. No.: 08/791,061

[22] Filed: Jan. 29, 1997

Related U.S. Application Data

[60] Provisional application No. 60/010,926, Jan. 31, 1996.

[51] Int. Cl.[7] .............................. G02B 26/08; G02F 1/00; B41J 2/435
[52] U.S. Cl. ...................... 358/298; 359/224; 348/771; 347/239; 347/255
[58] Field of Search ................... 359/223, 224, 359/230, 846; 348/771; 347/239, 241, 242, 243, 244, 255, 256–260; 358/298

[56] References Cited

U.S. PATENT DOCUMENTS

| | | | |
|---|---|---|---|
| 5,331,454 | 7/1994 | Hornbeck | 359/224 |
| 5,583,688 | 12/1996 | Hornbeck | 359/291 |
| 5,670,977 | 9/1997 | Chiu et al. | 345/85 |

OTHER PUBLICATIONS

Nelson, W.E. and Rohit L. Bhuva, "Digital Micromirror Device Imaging Bar for Hardcopy", SPIE vol. 2413, Feb. 6–10, 1995, pp. 58–65.

*Primary Examiner*—Peter S. Wong
*Assistant Examiner*—Gregory J. Toatley, Jr.
*Attorney, Agent, or Firm*—Charles A. Brill; Frederick J. Telecky, Jr.; Richard L. Donaldson

[57] ABSTRACT

In classic optical rendering systems, the spot, illuminating a microdot on the photosensitive medium, is designed to overlap with neighboring microdots, typically having an overlap of 1.7 times the pitch of the microdots, for a luminous intensity of $1/e^2$ the highest intensity. A "sharp" photosensitive medium, such as a photographic film used in graphical applications, generates a binary circle, obtainable by thresholding. The area of such a circle is too large, which results in higher dot gain.

Many systems, such as electrographic systems, do not behave as a "sharp" medium. If intermediate energy levels are used, in order to obtain continuous tone or multiple density levels, thresholding behavior may be avoided by appropriate choice of energy levels. Such a different sensitometry results in specific requirements for the energy distribution for each microdot.

A square shaped uniform energy distribution within the space allotted to each microdot, allows for multiple density levels, without severe sensitometric requirements.

7 Claims, 7 Drawing Sheets

FIG. 9
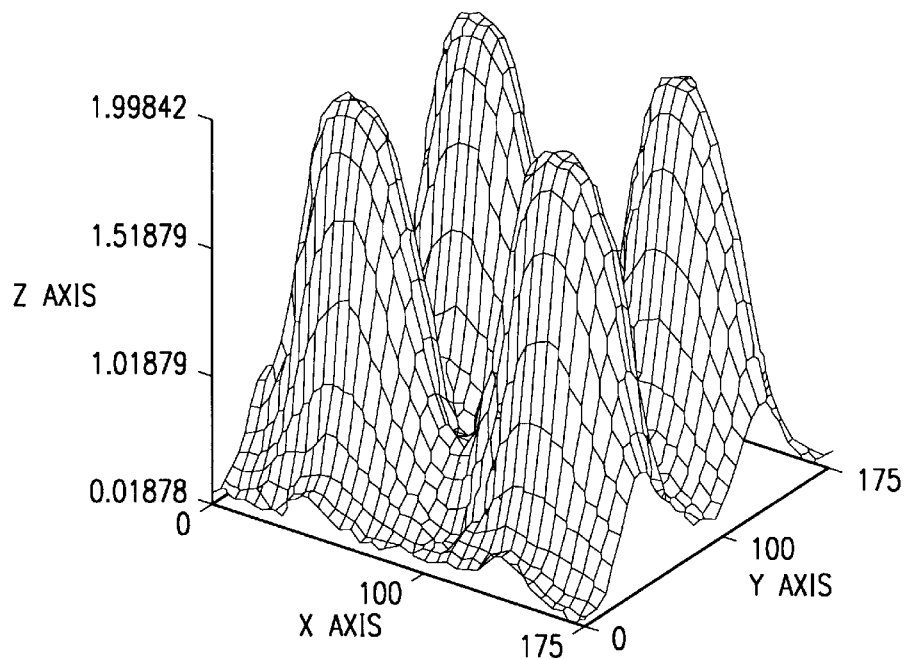
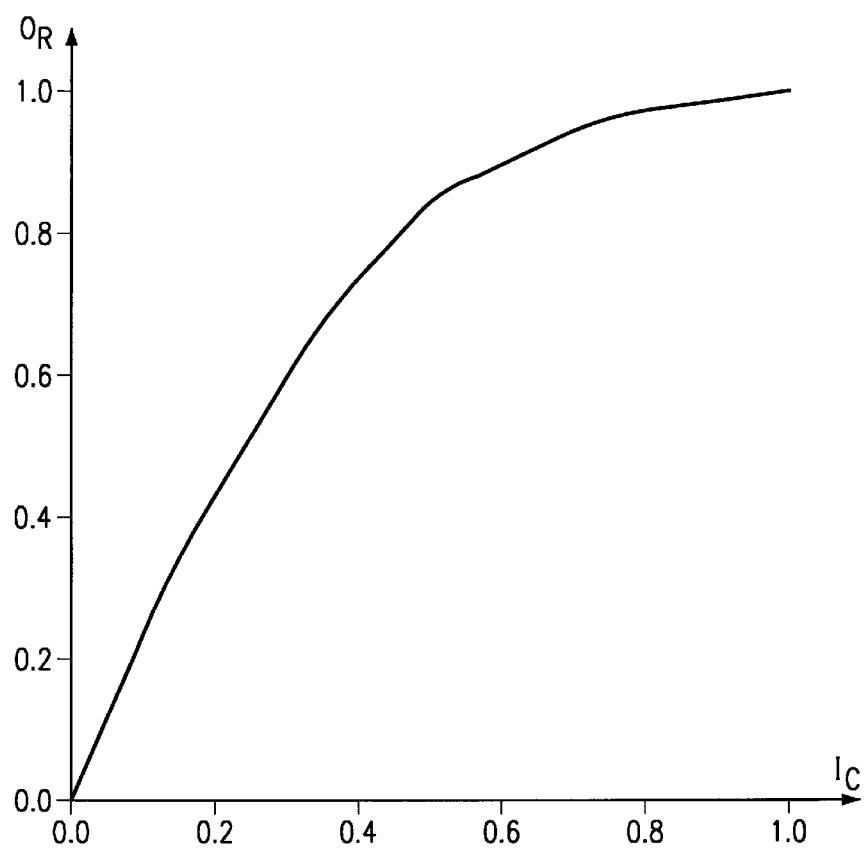
FIG. 10

UNIFORM EXPOSURE OF PHOTOSENSITIVE MEDIUM BY SQUARE INTENSITY PROFILES FOR PRINTING

This application claims priority under 35 U.S.C. § 119 (e) (1) of provisional application Ser. No. 60/010,926, filed Jan. 31, 1996.

FIELD OF THE INVENTION

The present invention relates to devices and methods for hardcopy printing. More specifically the invention is related to a hardcopy device that has an exposure subsystem that is responsible for the generation of a latent image on a photosensitive medium. This medium may be the final image carrier after development or alternatively an intermediate member, where the latent images are developed using developers of the appropriate colours and where the developed sub-images are transferred to the final substrate as is the case in electrophotography.

Even more specifically the invention is related to a hardcopy device as described above where the exposure system comprises a light source with collimation means which directs an expanded directional beam of light towards a spatial light modulator. The spatial light modulator comprises one or more rows of individual addressable elements which can direct the light towards or away from the projection optics. These optics project the imagewise light distribution from the spatial light modulator towards the photosensitive medium with the desired magnification.

BACKGROUND OF THE INVENTION

Various electronic devices are available on the market that transform a digital or electronic image to appropriate density variations on an image carrier, in order to render the electronic image visible on the image carrier. Alternatively, the electronic image is converted to an image-wise distribution of ink repellent and ink accepting zones on a printing plate, for use in e.g. offset printing.

An electronic image is typically represented by a rectangular matrix of pixels, each having a pixel value. The location of each pixel within the matrix corresponds to a specific location on the image carrier. Each pixel value corresponds to an optical density required on the image carrier at the specific location.

In a binary system, two pixel values, e.g. 0 and 1, are sufficient, to represent a high density and a low density, which may be obtained by applying ink and no ink respectively, or toner and no toner, or generating locally dye or no dye, or by keeping and removing silver in a photographic process. In the production of printing plates, 0 may result in an ink repellent zone, where 1 results in an ink accepting zone.

In a continuous tone system, multiple density levels may be generated on the image carrier, with no perceptible quantisation to them. In order to achieve such fine quantisation, usually 256 different density levels are required, such that each pixel value may range from 0 to 255. In electrophotography usually a reduced number of density levels can be generated consistently, e.g. 16 levels, in which case the system is called a multilevel system, as opposed to a binary system or a continuous tone system.

As said before, each "zone" or "microdot" on the image carrier gets a density, corresponding to a pixel value from the electronic image. Such a zone is indicated by the term "microdot." A microdot is the smallest space on the image carrier that can get an optical density (or ink repellency) different from neighbouring locations. Usually microdots are represented by squares or rectangles within parallel and orthogonal grid lines. The spacing of the grid lines is indicative for the resolution of the output device.

For each microdot on the image carrier, one pixel value is required. In an output device, based on image generation by exposure to light, the microdots are usually illuminated sequentially one at a time by (one or more) scanning laser beams. Microdots may be illuminated one row at a time, as with emitting LED bars or through spatial light modulators like liquid crystal (LCD) shutters or digital mirror devices (DMD). Whereas in the case of a scanning laser beam, the exposure beam profile is essentially gaussian, the profile of the imaging elements with spatial modulators is determined by the projection optics and the intrinsic shape of the DMD mirrors in the case of DMD system; the shape of LCD electrodes in the case of LCD systems; typically the shape of the selfoc optics; and the emitting regions of the LED's in an LED bar.

A typical laser scanner example is the Agfa P3400 laser printer, marketed by Agfa-Gevaert N.V., which is a 400 dpi (dots per inch) printer. Each microdot has approximately a size of 62 $\mu$m. The diameter of the circular spot is typically 88 $\mu$m. This means that within a radius of 44 $\mu$m the illuminance (W/m$^2$) of the light beam is everywhere higher than 50% of the maximum illuminance. The illumination is usually nearly Gaussian distributed. This means that the illuminance is maximal in the centre of the microdot or in the centre of the circular spot, and decays as the distance from this centre increases. In some systems, an elliptical spot is preferred above a circular spot. Usually, the short axis of the ellipse is oriented along the fast scan direction of the laser beam, to compensate for the elongation of the illumination spot as the beam moves during the finite exposure times.

A typical LED exposure example is the Agfa P400 laser printer, marketed by Agfa-Gevaert N.V., which is equally a 400 dpi (dots per inch) printer and has an extension of the spot of typically 88 $\mu$m.

The overlap of the illumination spots in these systems is designed as prescribed by an authoritative paper by H. Sonnenberg, titled "Laser-scanning parameters and latitudes in laser xerography," published by the Optical Society of America in Applied Optics, Volume 21, Number 10, 15 May 1982, pages 1745–1751. This paper gives an analysis of the width of lines in an image setting application with exposure by a scanning gaussian laser beam.

A problem with exposure systems, designed towards overlap along the diagonals of the rectangular microdot, is that the area exposed by single pixel illumination is larger than the rectangular microdot area as defined by the intersecting grid lines. This results in the fact that density contributions of a single isolated microdot as occurring in a halftone screen for the highlight portions of an image are larger than they should be.

In order to be able to compensate for this problem of tone shift in the highlights, screens of lower ruling or exposure systems of higher addressability are used, leading to lower quality or higher cost.

Another problem with electrophotographic systems, where the exposure system is designed towards overlap along the diagonals of the rectangular microdot, is associated with the use of contone, i.e. the use of different illumination energies at the microdot level, e.g. for purposes of multilevel halftoning. This problem becomes apparent when one considers the discharge characteristics of the photoconductor in the electrophotographic system as compared to the sensitometric response of graphical films.

Graphical films, used in conventional offset pre-press, invariably have a much steeper sensitometric response than organic photoconductors (OPC) used in electrophotographic printing systems, leading to a strongly nonlinear thresholding behaviour for the film, especially suited to binary offset printing with reasonable exposure latitude.

In an electrophotographic system, multilevel exposure at the microdot level is used to reduce tone gradation coarseness at a given screen ruling associated with the limited addressability. Exposure intensity at the pixel level is varied and the operation point on the discharge curve is chosen such as to have a nearly linear discharge behaviour as a function of exposure for most of the exposure range used.

Because of the smooth gradation response of the photosensitive medium, for which preferentially the conductivity varies when photons impinge on its surface, e.g. an organic photoconductor (OPC), an essentially uniform energy distribution within the microdot is required.

OBJECTS OF THE INVENTION

It is therefore a first object of the invention to provide a device and method for hardcopy printing where high quality images with high screen rulings can be rendered using exposure systems of moderate addressability (<1200 dpi) with improved linearity of the tone curve.

It is a further object of the invention to provide methods and devices for halftone image printing with improved tone scale linearity for electrophotographic systems with moderate addressability (<1200 dpi) using multiple bits per pixel illumination intensity modulation.

SUMMARY OF THE INVENTION

The above mentioned objects are realised by the specific features according to claim 1. Preferred embodiments of the invention are disclosed in the dependent claims. By these features, a homogeneous energy distribution, a high filling factor and a high OTF value are achieved.

The concept of Optical Transfer Function (OTF) value of an optical instrument, more specifically for a lens, is defined in the international ISO standard 9334. This value may be measured according to the principles and procedures as set out in the international ISO standard 9335. A useful application is described in the international ISO standard 9336-2, porting reference number ISO 9336-2:1994(E), entitled "Lenses for office copiers."

The active reflective area of a deflective mirror device is the total area reflecting light towards the photosensitive medium, if all mirrors are activated in the "on" state. The active reflective area is a fraction (typically 80%) of the total area formed by the envelope of all the deflective mirrors.

The spatial frequency of the mirrors in the deflective mirror device is defined by the number of mirrors per unit of length, e.g. the number of mirrors per millimetre or per linear inch. For the definition of the optical transfer function value, half this spatial frequency is used, because that frequency corresponds to the number of line pairs per millimetre, as measured at the object plane of the micromirrors. Line pairs may be produced by the device by alternately switching on and off neighbouring mirrors.

A photosensitive medium may be an OPC (organic photoconductor), or a photographic film, etc.

The collimation means may be a single lens. Alternatively, the collimation means may be a single mirror. The collimation means may also comprise just a plurality of lenses or in combination with at least one mirror or just a plurality of mirrors or in combination with at least one lens. In one preferred embodiment, the collimation means comprises a light source, a condenser system, and spatial light modulation means.

As examples only, a spatial light modulation means may be a deflective mirror device or a liquid crystal shutter.

DETAILED DESCRIPTION OF THE INVENTION

The invention is described hereinafter by way of examples with reference to the accompanying figures wherein:

FIG. 9 shows a typical energy distribution (Z) as a function of the spatial coordinates X and Y, as measured on a photosensitive medium, for a pseudo-Gaussian non-overlapping light distribution;

FIG. 10 shows the relative opacity $O_R$, obtained by a light distribution according to the current invention, as a function of the grey level value of a digital binary error diffusion image.

While the present invention will hereinafter be described in connection with preferred embodiments thereof, it will be understood that it is not intended to limit the invention to those embodiments. On the contrary, it is intended to cover all alternatives, modifications, and equivalents as may be included within the spirit and scope of the invention as defined by the appending claims.

Figure 1:
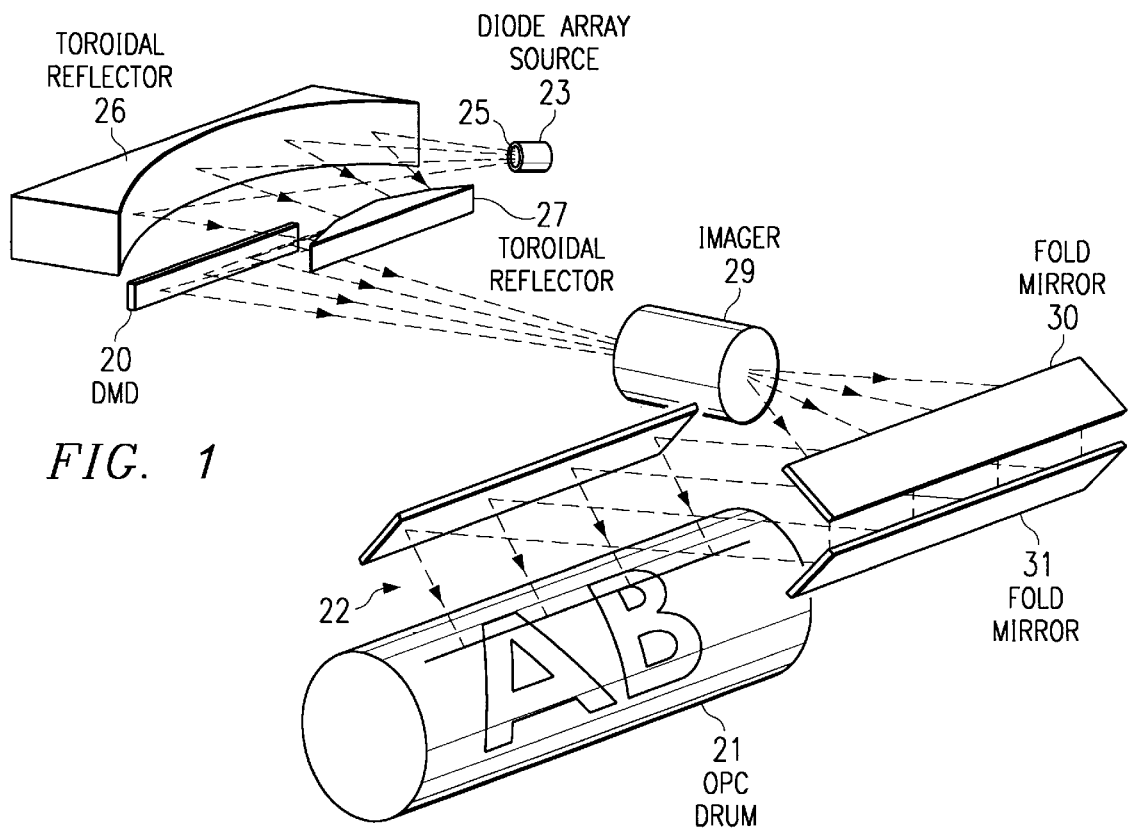
FIG. 1 shows a specific embodiment of a device comprising deflective mirror devices for carrying out the method according to the current invention.
Figure 11:
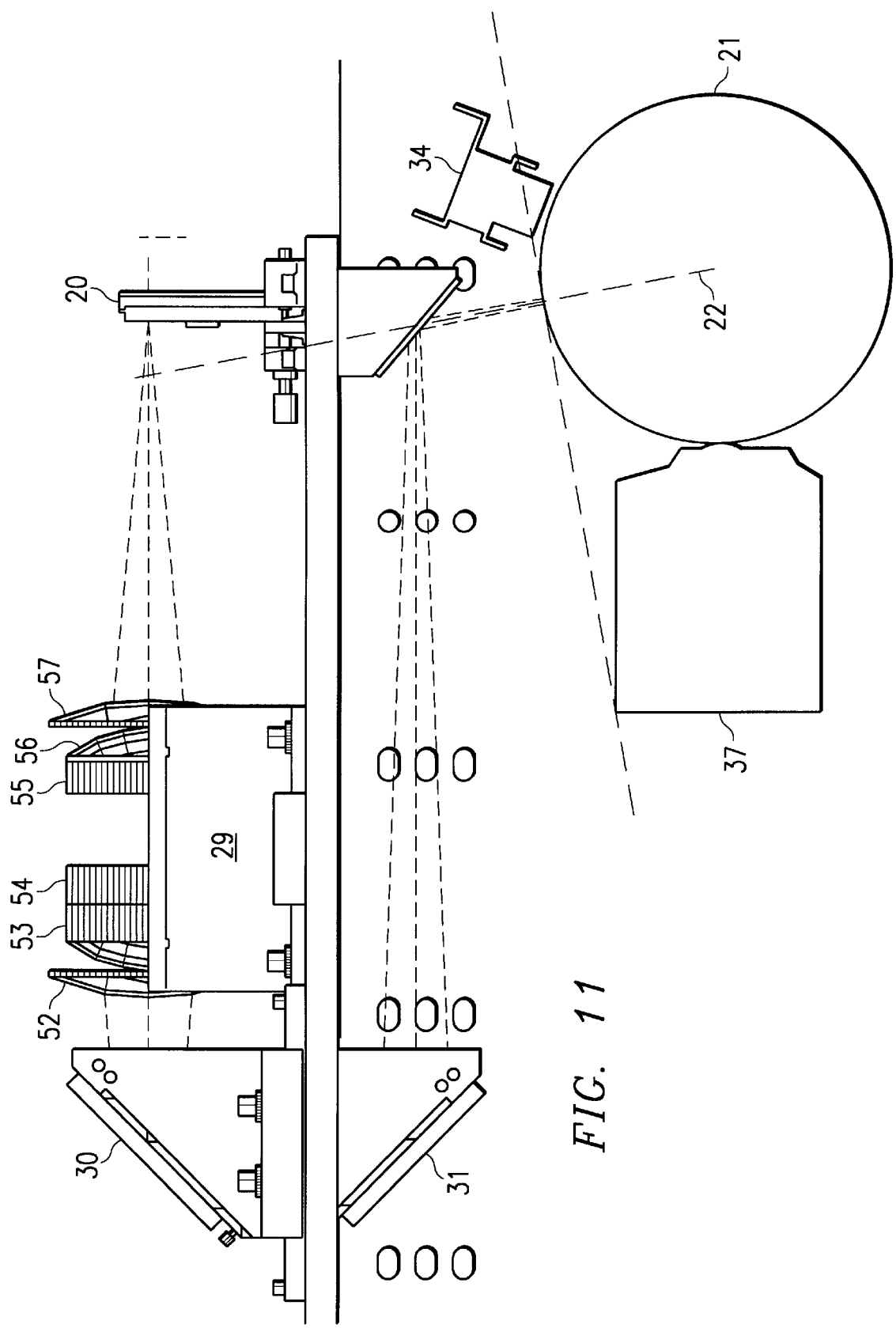
FIG. 11 shows a schematic view according to FIG. 1, for a suitable embodiment for carrying out the current invention.

In a preferred embodiment according to FIG. 1, the light modulation means (20) or spatial light modulator is a deflective micromirror device (DMD), as developed by Texas Instruments Inc. Modulation of the light energy (22) impinging on the DMD, such that the image wise modulated light beam reaches a photosensitive medium (21), is described in EP-A-620-676. FIG. 11 shows a schematic view of FIG. 1, comprising the following elements: A spatial light modulation means (20), projecting the image to an imager lens (29), which is built up by a six-element symmetric Gauss system, comprising six lens elements (52, 53, 54, 55, 56, 57), fold mirrors (30, 31) for projecting the light beam (22) towards the photosensitive medium (21), which has been pre-charged by the charge station (34). The latent image generated by the modulated light beam (22) is developed by the developer subsystem (37), supplying toner to the photosensitive medium.

Figure 3:
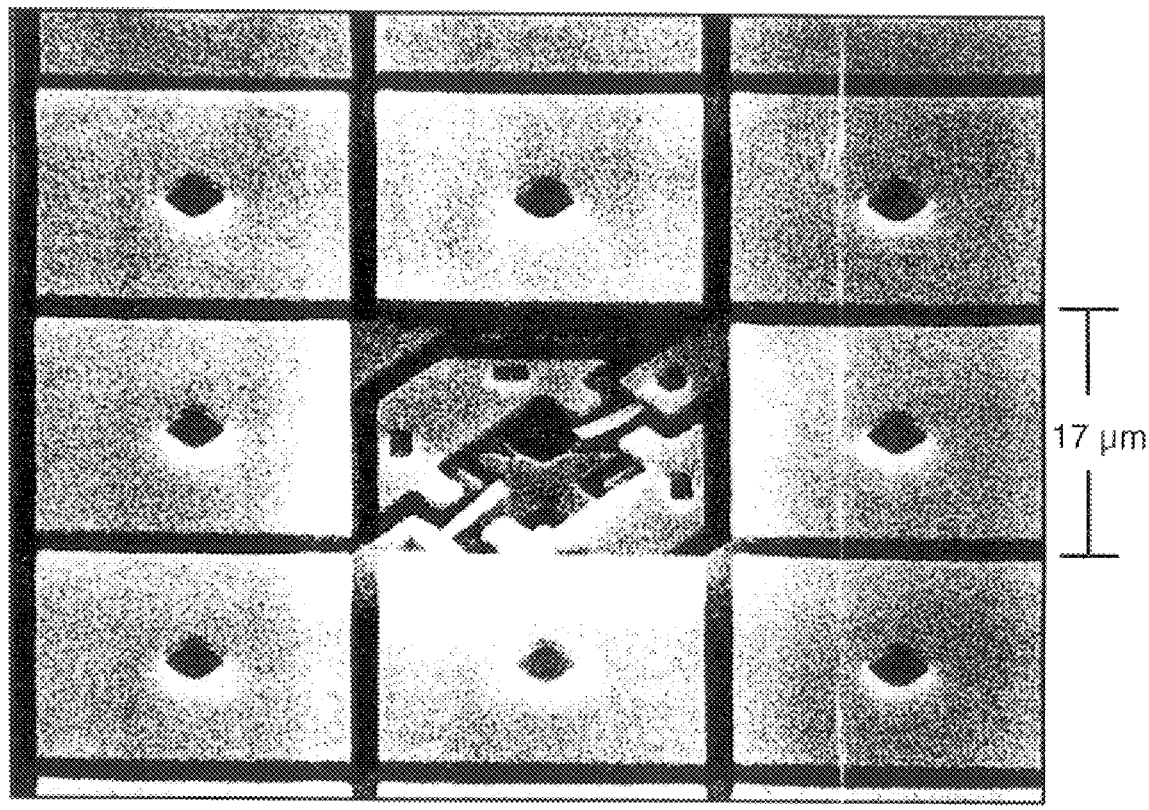
FIG. 3 shows a SEM of deflective micro mirrors, comprising gaps and support posts.

Referring to FIG. 3, which is a figure made by a Scanning Electron Microscope (SEM), an actual section of DMD micro mirrors shows gaps and support posts. The central mirror and yoke section have been deliberately removed to reveal the address electrodes and bias/reset bus, as well as the ruptured torsion hinges. The gaps on this sample are 1.2 micrometre wide, giving a fill factor of 85%. In a more preferred embodiment, gaps are 0.8 micrometre wide, giving a fill factor of 91%.

Spatial light modulation is achieved in a dark-field projection system (FIG. 1 and 11), that discriminates between light reflected from mirrors tipped in the on-state direction and those tipped in the other. The mirror tilt angle $\theta_L$ is ±10 degrees from the plane of the silicon substrate, so the illumination is incident on the DMD 20 degrees ($2\theta_L$) from the perpendicular to the silicon plane.

Exposure module

A preferred embodiment of an exposure module is now described as shown schematically in FIG. 1. As light source (23) a Hitachi HLP 30 RA IRED system may be used, comprising a 1 by 6 array producing light at a wavelength of 765 nm. This lamp has a maximal optical output of 250 mW D.C.

The condenser system (25, 26, 27) comprises three elements: a first collection element (25), preferably made of plastic material and two toroidal reflectors (26, 27), preferably diamond turned off axis.

The spatial light modulator (20) is preferably a DMD array comprising 7056×64 mirror elements, each element having a size of 16 by 16 micrometre and a spacing of 17 micron. This corresponds to 30 cycles/mm, periods or line pairs per millimetre at the object plane of the DMD array, for a 1 pixel on—1 pixel off pattern.

The projection lens (29) is formed preferably by a six-element double gauss sytem, operated at an effective focal length of 180 mm. The total conjugate length is preferably 825 mm. The input numerical aperture is 0.9, whereas the output numerical aperture is 0.036. The magnification is 2.4. In the preferred embodiment, the object size is 125 mm, the image size 300 mm.

Figure 4:
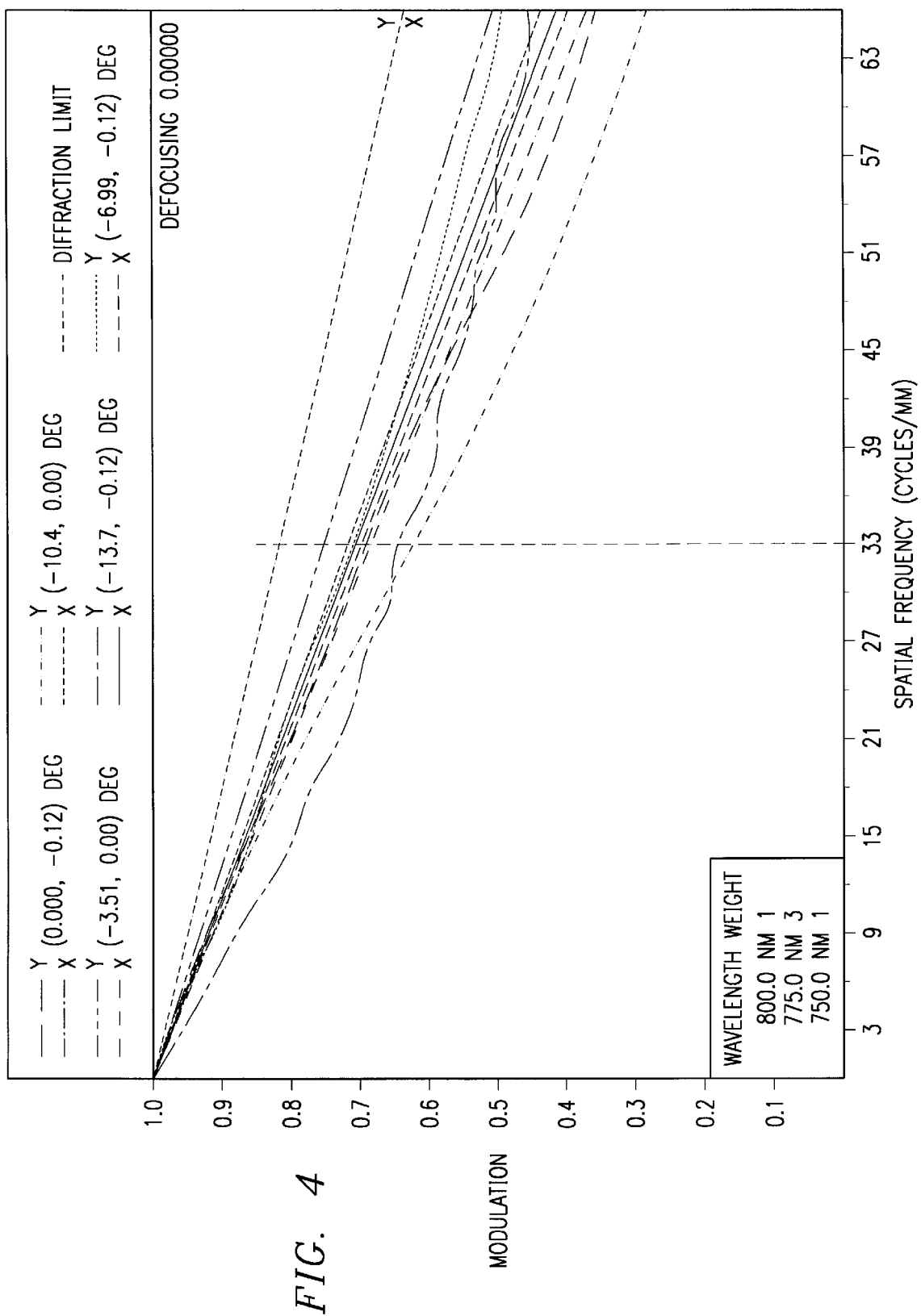
FIG. 4 shows an MTF or Optical Transfer Function (OTF) for a specific lens, suitable for carrying out the current invention, as a function of the spatial frequency of line pairs.

The Optical Transfer Function (OTF) characteristic of this lens design at optimum focus is given in FIG. 4. Each curve in FIG. 4 shows the MTF (Modulation Transfer Function value) in ordinate as a function of the spatial frequency of the image offered to the lens. The spatial frequency is expressed in cycles per millimetre or line pairs per mm. The MTF is expressed relative to the MTF at zero spatial frequency. The different curves represent the MTF for different values of incident angle of light, relative to the optical axis. It can be easily derived from FIG. 4 that for 30 or 32 cycles per mm, the MTF is within a range of [0.6, 0.8].

A schematic representation of a preferred embodiment of the DMD optical subsystem is shown in FIG. 1, comprising diode array source (23), toroidal reflectors (26, 27), deflective mirror devices (20) and an OPC drum (21). The dark-field optics principles as a described above work well for symmetric, nearly square display devices. The optical subsystem of FIG. 1 has the advantages of efficiently collecting light energy and uniformly illuminating a device with an aspect ratio of 110:1. The incident illumination arrives at the DMD (20) from the $2 \theta_L$ direction; otherwise it will miss the imager lens aperture (29) and not be modulated to the image plane.

FIG. 1 schematically represents the optical system used to evaluate the DMD in a 297 mm wide printer process test bed. The main features of the respective elements were summarised above. This illuminator design incorporates inexpensive discrete LED emitters as a source (23), chosen in this case to operate at 765 nm, but not limited to that wavelength. The illuminator efficiently collects and directs the light onto the DMD (20) via a pair of diamond turned toroidal reflectors (26, 27). The imager is a very basic symmetric double-gauss design. In a first embodiment, this design operates at f/4, whereas in a more preferred embodiment, it operates at f/5.6. Fold mirrors (30, 31) may be used to direct the ray fan to the OPC surface (21), thus minimizing the volume of the subsystem.

The use of an LED source allows precise control over the timing and amplitude of the exposure. A 10% LED duty cycle is sufficient for exposure of commercially available organic photoreceptors in the largest process speed range, i.e. 100 to 200 mm/sec printing speed. In a preferred embodiment, the imager MTF (or OTF: Optical Transfer Function) is 32 line pairs per millimetre at the DMD plane (20), resulting in a well resolved DMD image at the OPC surface (21).

Illumination profile characterisation

Figure 2:
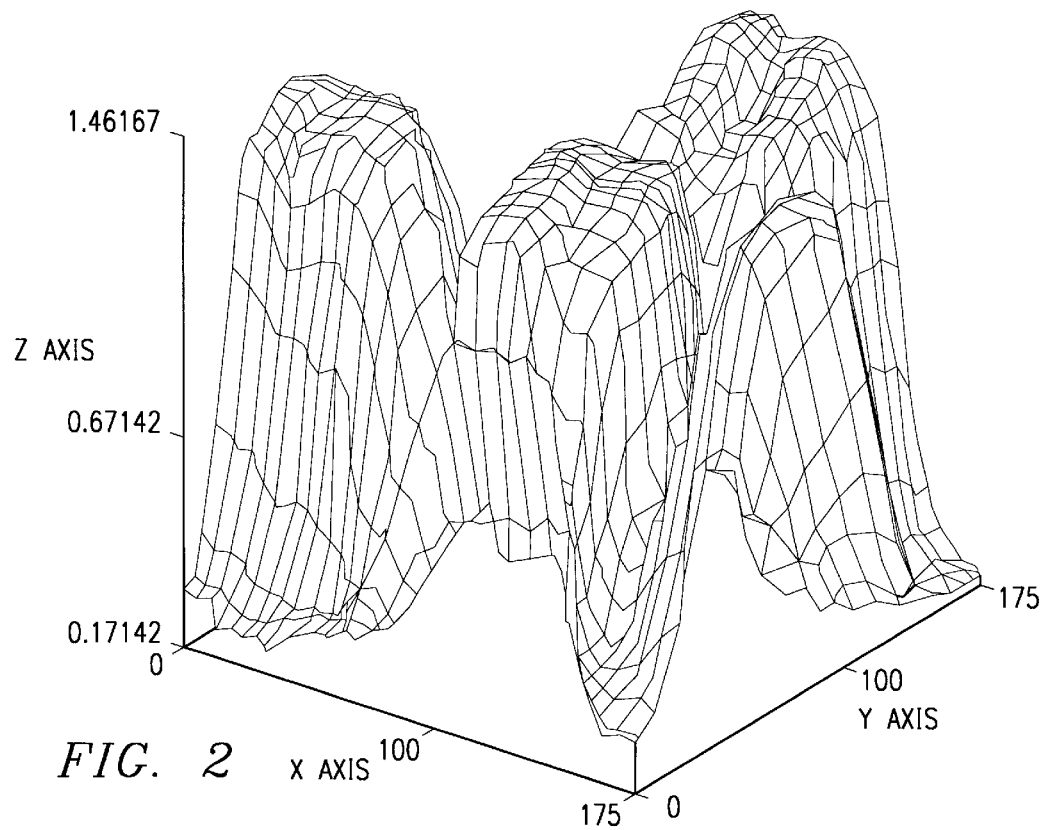
FIG. 2 shows a typical energy distribution (Z) as a function of the spatial coordinates X and Y, as measured on a photosensitive medium.

In order to establish the illumination profile characteristics, an AGFA "Holotest 10 e 75 Ti NAH 35 mm" high resolution holographic photographic film was mounted on the OPC (organic photoconductor) drum and a focus adjustment was made to compensate for the 100 nm film thickness. Static exposures were made with sparse illumination where a single on-pixel is separated by at least 8 off-pixels from any other on-pixel. The exposed and developed film was scanned and digitized at 1.9 micron resolution using a CCD equipped Leitz microscope. As such, DMD pixel profiles were captured and digitized for varying exposure conditions. The relative exposure intensity profile for a single pixel or microdot at the printing surface, according to the current invention, is given in FIG. 2. After correction for the film response, the resulting 3-D intensity plot suggests a steep-sided square-shaped pixel. Two dimensional images of the same data clearly show a square exposure profile with a nominal 42 micrometre side. FIG. 2 shows a sample with three adjacent pixels. The tops are saturated, but the individual pixels are clearly resolvable. The structure on the top of the pixels is related to the DMD support post. The conclusion is that the DMD exposure profile is that of a square pixel similar in shape to the DMD pixel, because the optical system MTF is sufficient to preserve the edges.

Determination of operating points in an electrophotographic process

Figure 5:
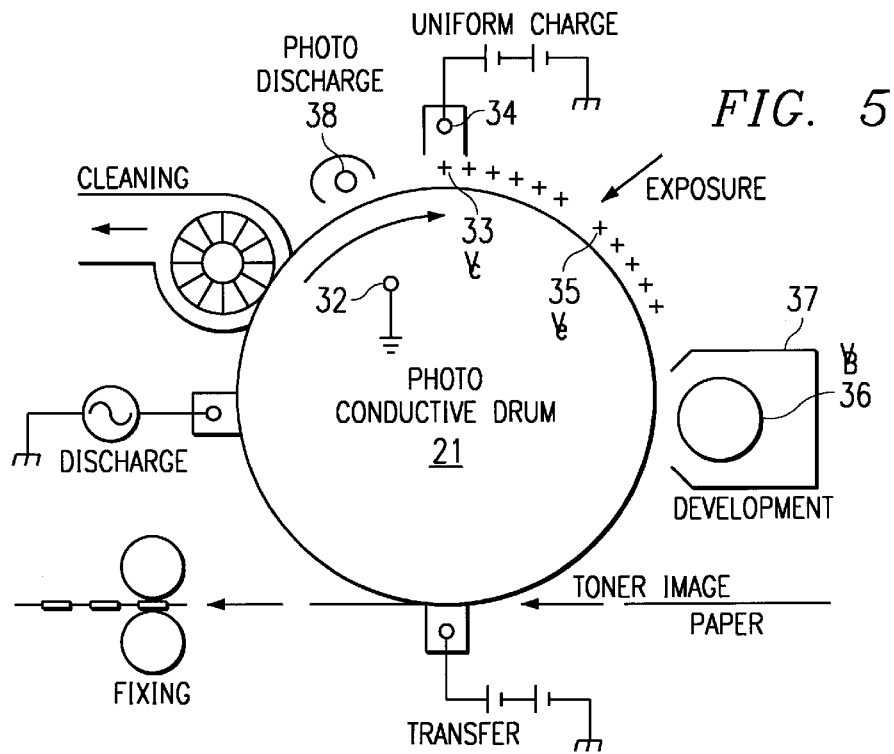
FIG. 5 shows the basic concept of an electrophotographic device, suitable for the current invention.
Figure 6:
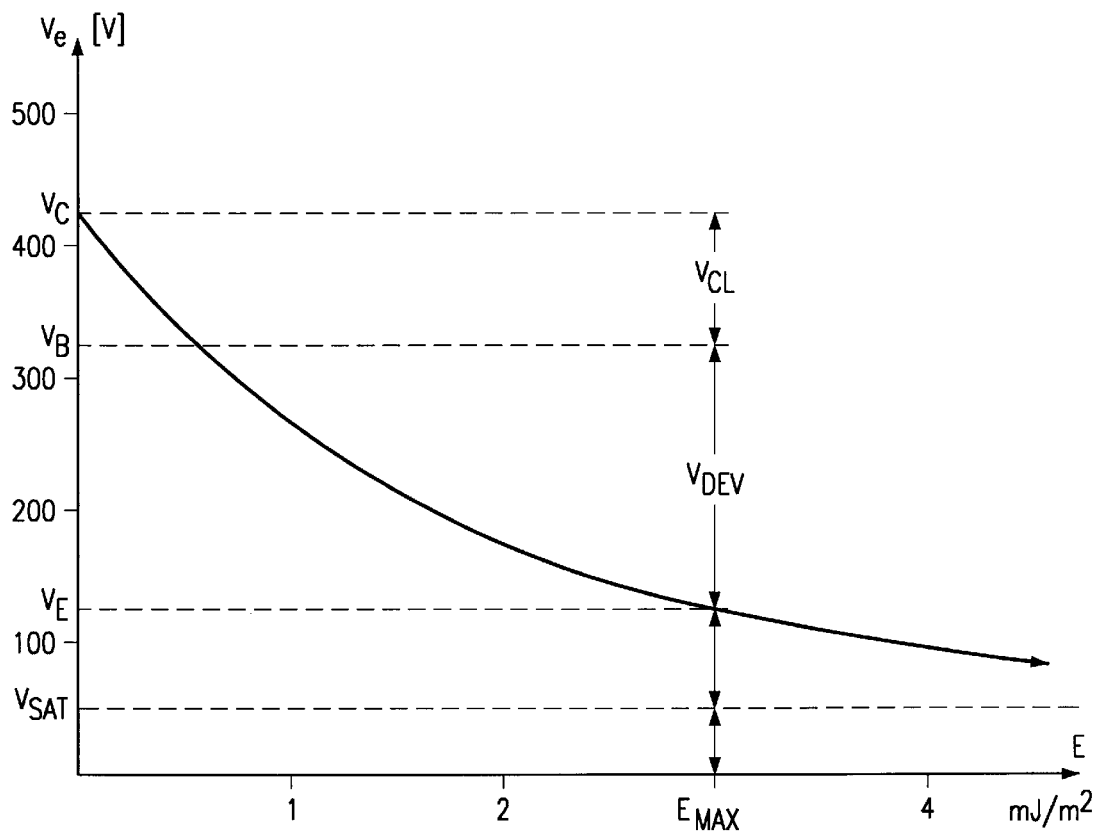
FIG. 6 shows the potential $V_\theta$ at the surface of an OPC, suitable for the current invention, after exposure E of the OPC. $V_\theta$ is plotted against E.

In order to facilitate the concepts to follow, a definition of potentials, voltages and terms is given, in conjunction with FIG. 5 and FIG. 6. All potentials are referred to the ground potential (32) of the OPC (21).

$V_C$ charge potential (33): potential to which the OPC is brought by the charge station (34). In the example of FIG. 6, $V_C$ has a value of 425 Volt.

$V_\theta$ potential (35) after exposure E (expressed in mJ/m²) of the OPC.

$V_E$ potential after maximal exposure $E_{MAX}$ of the OPC. The exposure E by a light source, such as a lamp or an LED, which impinges on the OPC, may be expressed in mJ/m². Maximal exposure $E=E_{MAX}$ of two neighbouring microdots may influence this potential $V_E$ after maximal exposure. A typical value for $V_E$ is 125 V, whereas a typical value for $E_{MAX}$ is 3 mJ/m$^2$.

$V_B$ bias voltage (36) between:
the developer subsystem (37) supplying the toner; and,
the ground potential (32) of the OPC (21).

A typical value for $V_B$ is 325 V, as shown in FIG. 6.

$V_{DEV}$ development potential=$V_B$-$V_E$. A typical voltage to achieve full development to solid toner is 325-125=200 V.

$V_{CL}$ cleaning potential=$V_C$-$V_B$. A typical value for repelling enough toner particles from a non-exposed area is 425-325=100 V. $V_{CL}$ is usually betwen 50 and 100 V.

$V_{SAT}$ saturation potential. This potential is shown on FIG. 6 and is defined by the asymptotic value for E→∞ for the curve in FIG. 6, as indicated by the arrow.

Charge voltage $V_C$ and discharge voltage $V_c$ can be measured using a contactless electrostatic voltmeter such as a TREK model number 856 (trademark of TREK Inc.), which is preferentially mounted towards the OPC surface (21).

The approach followed, to define the process parameters for the reversal development process, is described by reference to FIG. 6. In abscissa, the exposure energy level E is shown, expressed in mJ/m$^2$. In ordinate, the potential after exposure $V_\theta$ is shown, expressed in Volt and with reference to the saturation voltage $V_{SAT}$, the bias voltage $V_D$ and the charge potential $V_C$. The curve in FIG. 6 shows the discharge curve, which gives the potential $V_\theta$ on the OPC after exposure by an energy E. In normal operation, the exposure system is operated between 0 and $E_{MAX}$, such that the potential $V_\theta$ may vary between $V_C$ and $V_E$.

The process parameters shown in FIG. 6 are preferentially obtained in the following way. The saturation voltage $V_{SAT}$, or saturation exposure potential, is a system parameter, determined mainly by the OPC type, the processing speed, the engine geometry (clock position of charging (34) and development (37) ) and erase lamp (38) settings (fatigue). Once the building components of the system are defined, $V_{SAT}$ is fixed. A typical value for $V_{SAT}$ is 50 V.

Next $V_{CL}$ is determined for a given development system. The value for the cleaning potential $V_{CL}$ must be selected such that the fog level of the printing system is visually acceptable. If $V_{CL}$ is too low, then locations on the OPC having a voltage level of $V_C$ would not repel toner particles, resulting in fog on the printed document. On the other hand, selecting $V_{CL}$ to high gives other problems. A typical value for $V_{CL}$ is 100 V.

According to FIG. 6, two parameters may be further fixed: i.e. $V_{DEV}$ and $V_C$. By changing $V_C$, the shape of the curve as shown in FIG. 6 is changed. If $V_C$ is increased to a higher voltage, then the whole curve moves to a higher position, since its asymptotic value $V_{SAT}$ remains the same. If $V_C$ is decreased, the discharge curve moves to a lower position. $V_C$ and $V_{DEV}$ must be selected such that the following two conditions are satisfied:

A. the required density $D_{MAX}$ or target full solid density development, being a design specification e.g. $D_{MAX}$=1.8 for black toner, is obtained on the printed material by exposure $E_{MAX}$, giving exposure voltage $V_E$; and,

B. $V_E$=$V_{SAT}$+$V_{CL}$.

Values satisfying these conditions may be found by an iterative procedure, which may go as follows. First a reasonable value for $V_C$ is selected, say $V_{C1}$. By subsequent exposure of the OPC, pre-charged at $V_{C1}$, by different exposure levels $E_g$, different values for $V_\theta$, i.e. $V_{\theta1J}$ are obtained. The exposure voltage $V_{\theta1J}$ depends not only on the exposure level $E_g$, but also on the charge potential $V_{C1}$, hence the index 1. By plotting $V_{\theta1J}$ as a function of $E_J$, a curve as shown in FIG. 6 is obtained. The system having charge potential $V_{C1}$ is now used to produce printed output. A suitable value for $E_{MAX}$ is selected, in order to produce a toner image. The optical density D of the toner image is measured and compared to $D_{MAX}$, the required highest density. If D is lower than $D_{MAX}$, then $E_{MAX}$ is increased, if D is higher than $D_{MAX}$, then $E_{MAX}$ is decreased, until a value for $E_{MAX}$ is found, suitable for producing the density $D_{MAX}$. From the curve in FIG. 6, given the suitable exposure level $E_{MAX}$, the corresponding value $V_E$ can be obtained. Alternatively, this value $V_E$ may e measured during printing $D_{MAX}$. Since $V_{C1}$ and $V_{CL}$ are fixed, $V_{DEV}$ maye computed. This value $V_{DEV}$ is used to assess the equation: $V_E$=$V_{SAT}$+¼ ($V_{DEV}$+$V_{CL}$). If this is fulfilled, then the iteration stops and good values for both $V_C$ and $V_{DEV}$ have been found. Otherwise, the process may reiterate, by selecting a new value for $V_C$, e.g.:

$$V_{C2}=V_{SAT}+5/4*(V_{DEV}+V_{CL})$$

By the above sketched method, the exposure gain, required to discharge with an all-pixels-on pattern to the potential after exposure, is determined:

$$V_E=V_{SAT}+¼\ (V_{DEV}+V_{CL})$$

The factors ¼ and ⅝ are introduced to determine the operation point for the potential after exposure $V_E$ in function of the charge potential $V_C$, in order to keep the relative discharge approximately equal. The factor ¼ may more generally be chosen within the range [⅛, ½]; the factor ⅝ changes accordingly.

Error Diffusion Test

A standard binary test pattern was created comprising a wedge of 16 steps of linearly decreasing grey levels dithered using a variant of the Floyd-Steinberg error diffusion algorithm. Such a wedge can be generated for instance using a software package like Adobe Photoshop (Trademark of Adobe Systems Inc.) in the form of a binary pixel map which can be included in the page description language to be sent to the printer. We suppose that 1.0 corresponds to the maximum (relative) density achievable by the binary device. In order to achieve a relative density of 0.25, one microdot out of four is set to the highest optical density, e.g. black, and three microdots out of four are set to the lowest optical density, e.g. white. Such patterns have the interesting property that the mean distance between printed dots decreases as the grey level increases. The number of printed dots per unit of area increases linearly with the grey value requested. The printed wedge is then measured with a densitometer like the Macbeth model reflection densitometer and the density is converted to Opacity: Opacity=255* (1-10$^{-D}$).

If isolated printed microdots have sufficient density and are larger than the area defined by the intersecting grid lines defining the recorder grid, the slope of the Opacity versus requested grey level (0-255) curve (see FIG. 7) near the origin is greater than unity. A linear behaviour is typical for the highlight area where dots are far enough apart that they do not overlap. At a given point, when the grey value requested increases, a change of slope can be noticed which indicates printed pixels start to interact. This interaction can be due to non-linear behaviour at the level of:

the exposure discharge
the development
the transfer
the fixing
light scattering in the paper In the analysis of various preferred embodiments of the current invention in comparison with counter examples, parameters such as paper type and the electrophotographic process were kept unchanged in order to evaluate the effect of the exposure discharge step.

Figure 7:
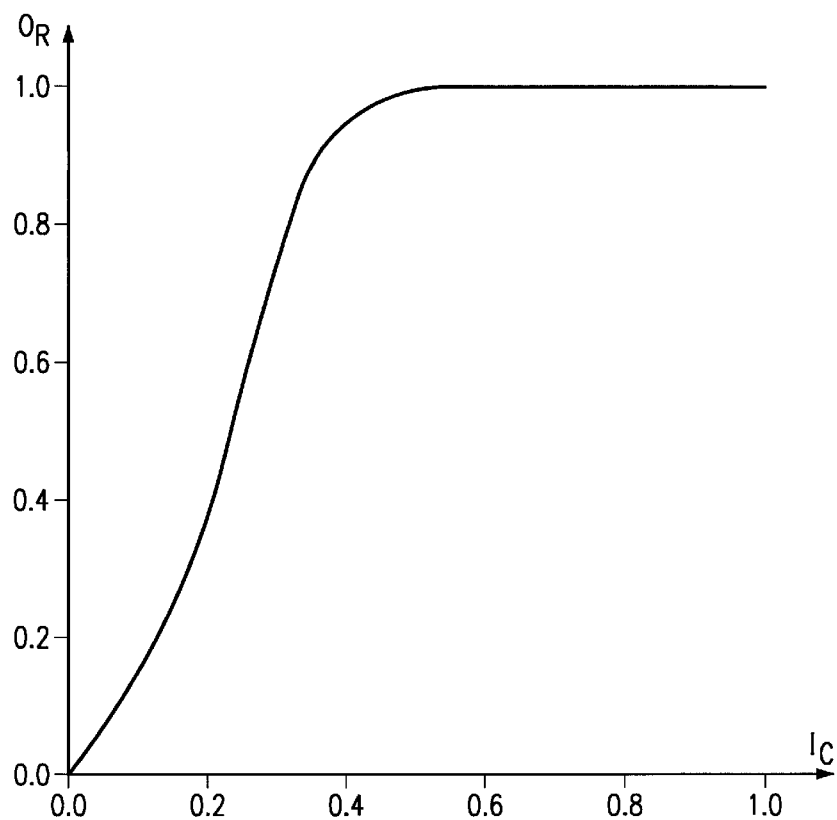
FIG. 7 shows the relative opacity $O_R$, obtained by an overlapping gaussian light distribution, as a function of the grey level value of a digital binary error diffusion image.

Tests, as reported in FIG. 7, have shown that defocused overlapping microdots do not have the proper density until there is overlap from neighbouring dots. Then there is a steep increase in the opacity versus required grey value curve, followed by a saturation plateau starting around input grey value 128 (50%, $I_C$=0.5). In FIG. 7 the relative capacity $O_R$ measured on the printed document is plotted as a function of the digital continuous tone pixel value or grey level value $I_C$, given to the halftoning process. The measured relative opacity $O_R$ is defined by the formula:

$$O_R = 1 - \frac{10^{-D\,measured} - 10^{-D\,solid\,toner}}{10^{-D\,paper} - 10^{-D\,solid\,toner}}$$

In the above formula, D stands for optical density, defined by:

$$D = \log_{10}(I_R/I_O)$$

wherein $\log_{10}$ is the logarithm with base 10, $I_O$ is the intensity of the incident light on the printed output and $I_R$ is the intensity of the reflected light for an opaque printed substrate. For a transparent substrate, $I_R$ is preferentially substituted by $I_T$, being the intensity of the transmitted light.

The digital continuous tone pixel value or grey level value $I_C$ in abscissa is linearly scaled to the range of [0.0, 1.0], wherein $I_C$=0.0 represents white and $I_C$=1.0 represents black. This means that, wherever the digital continuous tone image has a pixel value $I_C$=0.0, the corresponding microdot(s) on the reproduction or printed output for this digital image must carry no toner at all, and where the digital image has a pixel value $I_C$=1.0, the corresponding microdot(s) on the reproduction or printed output for this digital image must be covered by a full amount of toner.

The curve in FIG. 7 clearly shows a non-linear behaviour for $O_R$ as a function of $I_C$, when the continuous tone image is halftoned by a binary halftone process and printed by a conventional system, having overlapping gaussian exposure.

Figure 8:
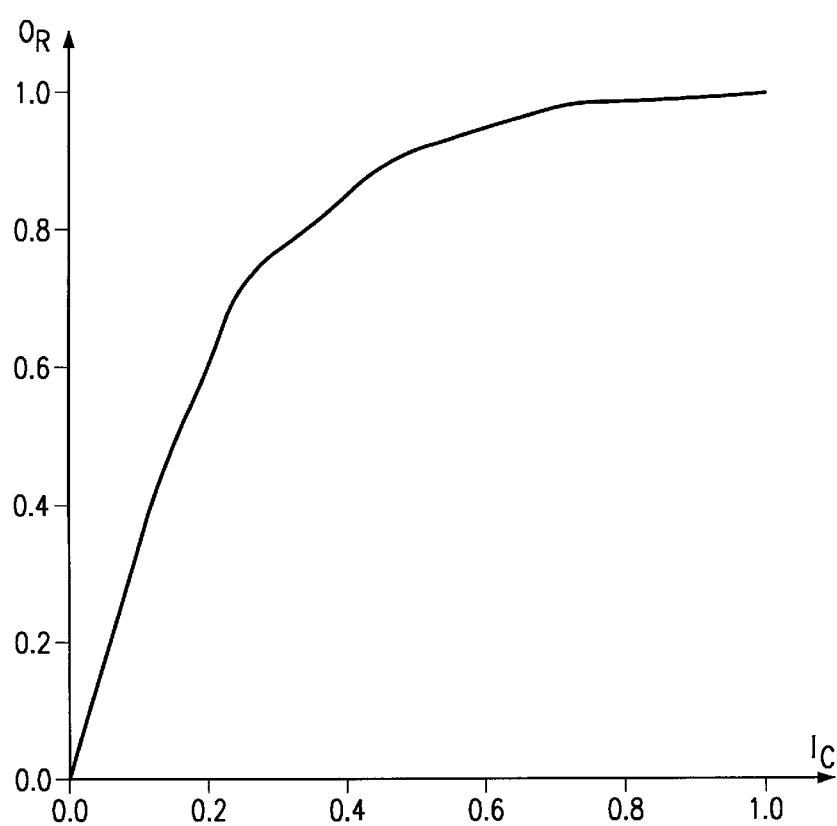
FIG. 8 shows the relative opacity $O_R$, obtained by a non-overlapping gaussian light distribution, as a function of the grey level value $I_C$ of a digital binary error diffusion image.

On the other hand, small non-overlapping microdots were obtained by a light modulator with slightly convex mirrors and slightly under-focused projection optics as to image the secondary light sources above each individual mirror. This gives rise to small sharply peaked illumination profiles which underfill the area of microdots corresponding to the intersecting grid lines of the recorder grid. A recording of the illumination profile for non-overlapping microdots is shown in FIG. 9. The curve in FIG. 8 shows, in the same way as FIG. 7, a non-linear behaviour for $O_R$ as a function of $I_C$, when the continuous tone image is halftoned by a binary halftone process and printed by a conventional system, having smaller coverage of microdots by toner particles, for microdots having a profile as shown in FIG. 9. Because of the spatially restricted size of the illuminated zone per microdot, over-exposure of the microdots on the OPC is required, in order to achieve a solid area of toner.

Although it should be possible with the reduced pixel area to improve (reduce) the slope of the opacity versus required grey scale curve, it was found that, when the exposure gain is adjusted in order to meet the criteria, described in conjunction with FIG. 6, this does no longer hold. In order to get a nearly complete discharge with a solid area exposure of the non-overlapping pixels, the exposure gain is raised such that the exposure profile centre saturates and the effective size increases to normal value giving a more or less rounded dot.

According to the present invention, an exposure profile for a microdot is obtained as shown in FIG. 2, which may be compared with the non-overlapping exposure profile shown in FIG. 9. As described above, the exposure profile was obtained by recording on photographic film the exposure of one or more adjacent microdots. FIG. 10 shows, in the same way as FIG. 7, the relative opacity $O_R$ as a function of the digital grey level value $I_C$, for a microdot exposure profile according to the current invention. Comparing the curve in FIG. 10 with FIG. 8 and FIG. 7 shows that the behaviour of that curve is more linear and the linearity extends almost up to a grey level of 0.6, whereas the other curves have a linearity up to 0.4 only. According to FIG. 10, the behaviour of the curve is linear, starting from the origin, which is clearly not the case for the curve in FIG. 7. Whereas the curve in FIG. 7 is to flat close to the origin, it is to steep afterwards, from a grey level $I_C$-0.2 off. It is thus clear that, with microdots having an exposure profile according to the current invention, more grey levels may be relilably reproduced by the printing system.

Having described in detail preferred embodiments of the current invention, it will now be apparent to those skilled in the art that numerous modifications can be made therein without departing from the scope of the invention as defined in the following claims.

We claim:

1. A method for generating an image on an image carrier comprising the steps of:

partitioning said image carrier in a plurality of microdots, which fill said image carrier completely and do not overlap one another; and applying to each microdot an energy distribution which is substantially uniform within said microdot.

2. Method according to claim 1, wherein said energy distribution is generated by a light beam, deflected by a deflective mirror device, having an active reflective area of at least 80%.

3. Method according to claim 2, wherein said light beam is guided through projection optics, having an optical transfer function (OTF) value of at least 50% at half the spatial frequency of the mirrors in said deflective mirror device.

4. A system for generating an image on a photosensitive medium, comprising:

a light source;

collimation means for receiving light from said light source and providing collimated light;

spatial light modulation means for receiving said collimated light and for selectively modulating said collimated light;

projection optics for selectively projecting said modulated light;

said spatial light modulation means comprising a plurality of individually addressable elements having an active zone for temporarily directing a light beam towards said projection optics; and said elements being regularly spaced at a fixed spatial frequency and a filling factor of the active zone of at least 80%.

5. System according to claim 4, wherein said projection optics has an optical transfer function (OTF) value of at least 50% at half said fixed spatial frequency.

6. System according to claim 4, wherein the reflection or transmission of said elements decreases towards the centre of each element.

7. A system for generating an image on a photosensitive medium, comprising:

a light source;

collimation means for receiving light from said light source and for providing collimated light;

spatial light modulation means for receiving said collimated light and for selectively modulating said collimated light;

projection optics for selectively projecting said modulated light;

said spatial light modulation means comprising a plurality of individually addressable elements for temporarily directing a light beam towards said projection optics;

said elements being regularly spaced at a fixed spatial frequency; and said projection optics having an optical transfer function (OTF) value of at least 50% at half said fixed spatial frequency.

* * * * *